L. M. FRANCISCO.
CARBURETER.
APPLICATION FILED FEB. 12, 1914.

1,130,502.

Patented Mar. 2, 1915.
2 SHEETS—SHEET 1.

WITNESSES
E. K. Reichenbach.
L. McAuliffe

INVENTOR
Lynn M. Francisco
BY Munn & Co
ATTORNEYS

L. M. FRANCISCO.
CARBURETER.
APPLICATION FILED FEB. 12, 1914.
1,130,502.
Patented Mar. 2, 1915.
2 SHEETS—SHEET 2.
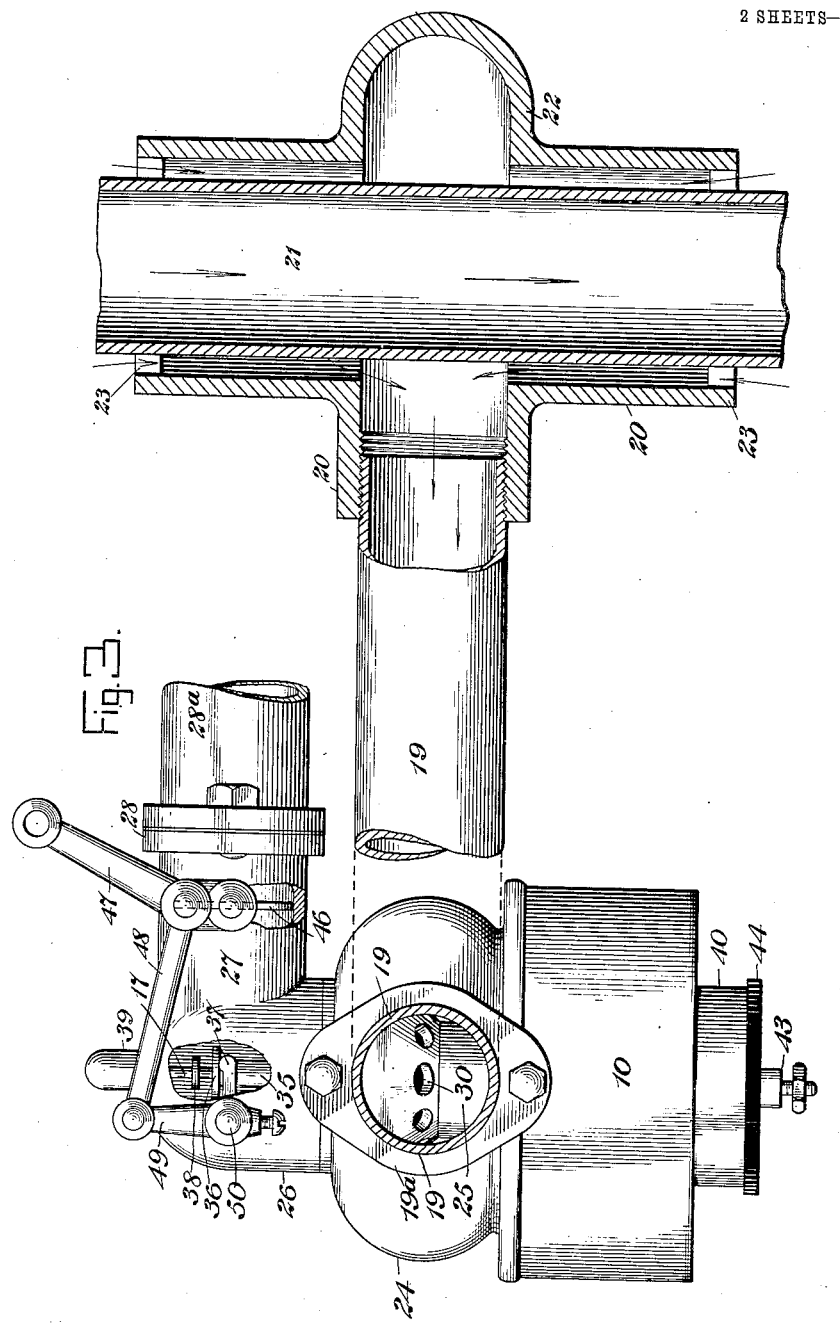
WITNESSES
INVENTOR
Lynn M. Francisco
BY
ATTORNEYS

UNITED STATES PATENT OFFICE.

LYNN MYERS FRANCISCO, OF BALDWINSVILLE, NEW YORK.

CARBURETER.

1,130,502.

Specification of Letters Patent.

Patented Mar. 2, 1915.

Application filed February 12, 1914. Serial No. 818,278.

*To all whom it may concern:*

Be it known that I, LYNN M. FRANCISCO, a citizen of the United States, and a resident of Baldwinsville, in the county of Onondaga and State of New York, have invented a new and Improved Carbureter, of which the following is a full, clear, and exact description.

My invention, although applicable to internal combustion engines in general, is more particularly designed to provide satisfactory starting and operation with kerosene as a fuel.

Objects of my invention are to provide a novel and effective means associated with the nozzle, to heat the latter, and thereby heat the fuel in the passage from the float chamber to the nozzle, as well as to furnish heat for the float chamber itself; to provide in connection with the air intake, a novel means for utilizing the heat from the exhaust pipe to heat the air in an effective manner; to provide an air chamber within the body of the carbureter so arranged that warm air from the air-heating means will raise the temperature of the carbureter body and contribute to the heating of the float chamber; to provide a novel arrangement of valve-controlled, auxiliary air inlets, the valve means of which is adapted to be actuated by the opening of the throttle; and to provide for simultaneously lifting the auxiliary air valve and the needle valve, for regulating the fuel supply by the opening of the throttle, so that the amount of air and fuel admitted under high speed with the throttle open, will be increased.

The invention resides in the novel means for carrying out the stated objects of the invention and the additional objects that will appear from the more specific description following.

Reference is to be had to the accompanying drawings forming a part of this specification, in which similar characters of reference indicate corresponding parts in all the views.

Figure 1:
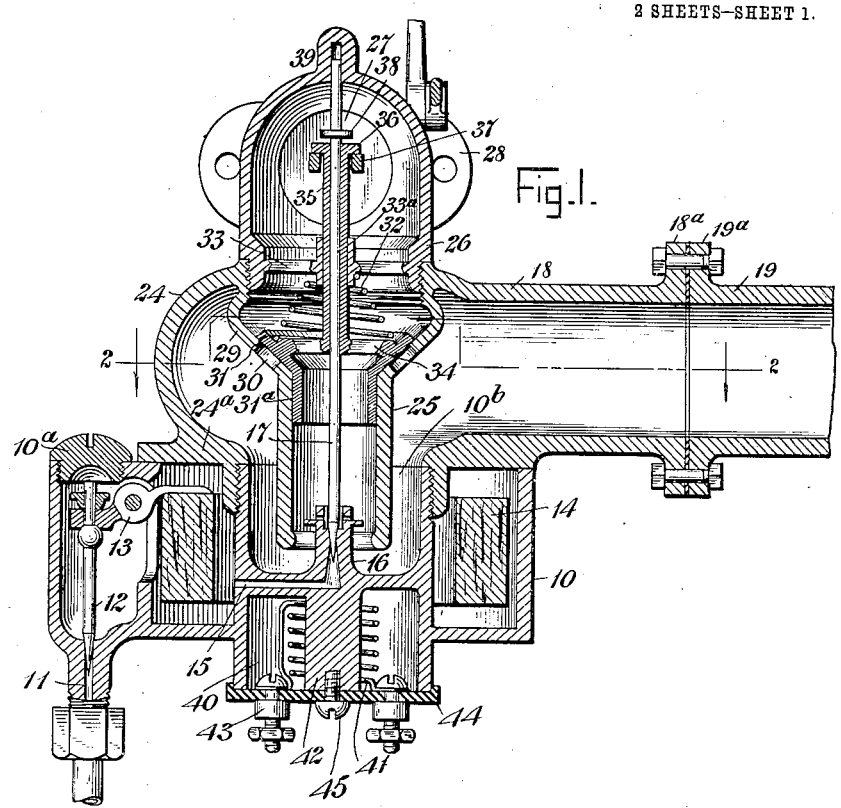
Figure 2:
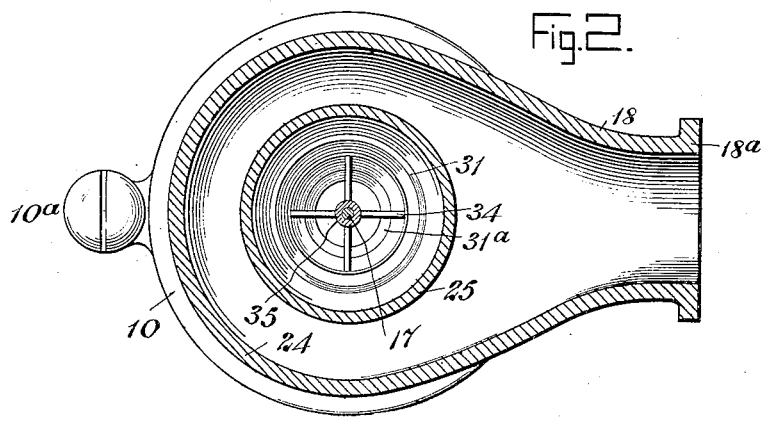

Figure 1 is a vertical section of a carbureter constructed in accordance with my invention; Fig. 2 is a horizontal section on approximately the line 2—2 of Fig. 1; and Fig. 3 is a side elevation, the view being taken at right angles to Fig. 1, and including a heater for the air passing to the intake.

In constructing a carbureter in accordance with the particular embodiment illustrated as an example, an annular float chamber 10 is provided at the under side of the carbureter concentric with the nozzle and mixing tube or choke tube hereinafter referred to. The float chamber has an inlet 11 at the bottom as usual, which in practice is connected with any convenient source of supply, the inlet being commanded by a float valve 12, as is customary, the valve being carried by a lever 13, one arm of which is connected with the float 14. The float chamber has a screw plug $10^a$ above the valve 12, to afford access to the latter, as usual.

A passage 15 leads from the float chamber to a nozzle 16, the terminal and discharge outlets of which may be in accordance with approved practice. Commanding the nozzle is a needle valve 17, to be hereinafter more particularly referred to.

The air intake 18 has connected therewith a supply pipe 19, and the latter leads from a heater casing 20 which surrounds the exhaust pipe 21 of the engine, the casing being generally of T-form presenting opposite inlet ends 23 around the exhaust pipe. The center of the casing is bulged or enlarged as at 22, to provide an annular heating chamber communicating with the pipe 19 leading to the intake 18. The enlargement of the casing, as at 22, provides for a large volume of air within the heater, so that the air will be retarded between the inlets 23 and the passage to the air intake, with a view to provide for the more effective heating of the air than if it were permitted to pass more rapidly and directly to the carbureter.

The air intake 18 leads to an air chamber 24 provided by bulging the body in line with the air intake, and the body of the carbureter at the bottom of the air chamber, as at $24^a$, forms the top of the float chamber 10, and thereby the heated air in the said air chamber will contribute to the heating of the float chamber 10, to maintain the fuel therein in a heated condition, which is desirable in the case of a fuel of the character of kerosene.

Concentrically disposed in the air chamber 24, and depending from the top thereof, is the mixing tube or choke tube 25, the lower open end of which extends into a depression $10^b$ concentric with the float chamber 10, and between the float chamber and the nozzle 16. The mixing tube 25 opens upwardly through the top of the air chamber 24 into a bonnet 26, the outlet 27 of which has the usual flange 28 for connection with the manifold intake of the engine, which is indicated in part at 28ª.

In order to provide for an auxiliary air supply under high speed, an auxiliary valved inlet is provided, and in connection with the valve thereof and with the needle valve commanding the nozzle, I provide means to actuate the valves by the opening of the throttle. For the indicated purpose the upper end 29 of the mixing tube or choke tube 25 is made flaring and formed with an inlet or inlets 30 leading to the interior from the air chamber 24. The inlets 30 are commanded by a tubular flared valve 31, adapted to seat on the flared inner surface of the extension 29. A spring 32, here shown as helical, bears at its lower end on a spider 34, connecting said valve 31 with the sleeve 35 surrounding the needle valve 17, the spring at its upper end abutting a fixed spider 33 in the bonnet 26. The hub 33ª of the spider 33 affords guided movement to the sleeve 35 of the air valve.

The upper end of the sleeve 35 has a head or flange 36, beneath which is a lifting fork 37 to be operated from the throttle lever, as hereinafter explained. Above the flange 36 on the sleeve 35, a collar 38 or equivalent projection is formed on the needle valve 17, so that the raising of the fork 37 will lift the air valve by contact with the flange 36, and will lift the needle valve by contact of the said flange 36 with the collar 38. The upper end of the needle valve may have movement in a projection 39 on the bonnet 26.

It will be observed from Fig. 1, that the valve 31 has a cylindrical tubular extension fitting within the mixing tube 25 so that the valve has guided movement, and the tubular character of the valve and its extension, it will be observed, affords free passage for the mixture of air and fuel drawn upward through the mixing tube 25, the passage of the fuel mixture not being impeded by the auxiliary valve whether the latter be seated or unseated.

In order to heat the nozzle and to contribute to the heating of the float chamber, an electric heater is arranged beneath the nozzle, at the center of the float chamber. In the example shown, a heating element 41 is coiled around a stud 42 depending from the base of the nozzle 16. The terminals of the heating elements are secured to binding posts 43 or their equivalents, on a cap 44 which closes the lower end of the heating chamber 40 in which the coil is located. Thus the heat generated by the electric heater will effectively heat the nozzle and the passage 15 leading thereto, as well as the float chamber, thereby maintaining the fuel at the proper temperature.

The means for operating the air valve and needle valve by the opening of the throttle consists, in the example shown, of a link 48 connecting the throttle lever 47 with a lifting lever 49, on the shaft 50 of which the lifting fork 37 is secured.

Having thus described my invention, I claim as new, and desire to secure by Letters Patent:

1. In a carbureter, a mixing tube, means to conduct air to said tube, a fuel nozzle discharging into said tube and having a base below the latter, a heating chamber beneath the nozzle, and means for heating said chamber, said heating means comprising a pendent stud on the base of the nozzle and an electric heating element around said stud.

2. In a carbureter, a mixing tube having a main air inlet, and an auxiliary air inlet above the main inlet, a fuel nozzle discharging to the mixing tube below the auxiliary air inlet, a needle valve commanding the nozzle and extending upwardly through the said tube, a valve commanding the air inlet and disposed at the interior of the tube, the latter valve having a sleeve through which the needle valve extends, a throttle lever, a lifting member operatively connected with the throttle lever, a member on one of said valves with which the lifting member engages, and a member on the other of said valves with which the member on the first valve engages, so that the action of the lifting member will lift both valves.

3. In a carbureter, a mixing tube having a main air inlet, and an auxiliary air inlet above the main air inlet, a fuel nozzle discharging to said tube, a tubular valve at the interior of the mixing tube and commanding the auxiliary air inlet, a helical spring bearing at its lower end on said valve, a fixed abutment against which the upper end of the spring bears, a sleeve extending upwardly through the said abutment and in fixed relation to the valve, a needle valve commanding the fuel nozzle and extending through said sleeve, a throttle, a throttle valve, and means operative by said throttle valve and adapted to actuate both of said valves.

In testimony whereof I have signed my name to this specification in the presence of two subscribing witnesses.

LYNN MYERS FRANCISCO.

Witnesses:
 MICHAEL DELANEY,
 H. C. DUNBURY.